(12) United States Patent
Clössner et al.

(10) Patent No.: US 10,308,437 B2
(45) Date of Patent: Jun. 4, 2019

(54) CONVEYOR DEVICE HAVING A LINEAR DRIVE AND HEIGHT-ADJUSTABLE CARRIERS FOR CONVEYING OBJECTS

(71) Applicant: WEBER MASCHINENBAU GmbH BREIDENBACH, Breidenbach (DE)

(72) Inventors: Stephan Clössner, Ehringshausen (DE); Christoph Eckhardt, Breidenbach (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 2 days.

(21) Appl. No.: 15/559,245

(22) PCT Filed: Mar. 17, 2016

(86) PCT No.: PCT/EP2016/055804
§ 371 (c)(1),
(2) Date: Sep. 18, 2017

(87) PCT Pub. No.: WO2016/146744
PCT Pub. Date: Sep. 22, 2016

(65) Prior Publication Data
US 2018/0086564 A1    Mar. 29, 2018

(30) Foreign Application Priority Data
Mar. 18, 2015 (DE) .................. 10 2015 104 023

(51) Int. Cl.
*B65G 17/00* (2006.01)
*B65G 17/48* (2006.01)
(Continued)

(52) U.S. Cl.
CPC .......... *B65G 17/48* (2013.01); *B65G 17/002* (2013.01); *B65G 17/34* (2013.01); *B65G 54/02* (2013.01); *B65G 2201/0202* (2013.01)

(58) Field of Classification Search
CPC combination set(s) only.
See application file for complete search history.

(56) References Cited

U.S. PATENT DOCUMENTS

| 4,960,203 A | 10/1990 | Kalazny |
| 5,156,093 A | 10/1992 | Azukizawa et al. |

(Continued)

FOREIGN PATENT DOCUMENTS

| DE | 4336908 A1 * | 5/1994 | ............. B65H 63/00 |
| DE | 102006034395 A1 | 2/2007 | |

(Continued)

OTHER PUBLICATIONS

English Translation of International Preliminary Report on Patentability; International Application No. PCT/EP2016/055804; dated Sep. 19, 2017; 9 pages.

(Continued)

*Primary Examiner* — Gene O Crawford
*Assistant Examiner* — Lester Rushin, III
(74) *Attorney, Agent, or Firm* — Cantor Colburn LLP (57) ABSTRACT

The invention relates to a device for moving objects, comprising a plurality of individually-movable conveyor movers (29) for conveying the objects, a track system (21) for said conveyor movers (29) in which the conveyor movers (29) can be moved along at least one predetermined track in a conveyor direction (T), and a control device for controlling the movements of said conveyor movers in the track system (21), the conveyor movers (29) each comprising at least one runner (27) that interacts with said track system (21), at least one carrier (29) for objects and, mounted on said runner (27), at least one retainer (31) for the carrier (29), said carrier (29) being adjustable relative to the runner (27) between a lower conveyor position and an upper functional position and thus being guided by the retainer (31).

19 Claims, 8 Drawing Sheets

(51) Int. Cl.
*B65G 54/02* (2006.01)
*B65G 17/34* (2006.01)

(56) References Cited

U.S. PATENT DOCUMENTS

| | | | |
|---|---|---|---|
| 6,105,749 | A | 8/2000 | Block et al. |
| 9,604,744 | B2 * | 3/2017 | Wintring ............... B65B 25/141 |
| 2008/0029366 | A1 | 2/2008 | Nakamura et al. |
| 2010/0263940 | A1 * | 10/2010 | Klauer .................. G01G 15/00 |
| | | | 177/1 |
| 2013/0334010 | A1 | 12/2013 | Gerber et al. |
| 2016/0207658 | A1 * | 7/2016 | Bellante ................. B65B 35/10 |

FOREIGN PATENT DOCUMENTS

| | | |
|---|---|---|
| DE | 202011106265 U1 | 2/2012 |
| DE | 102013212377 A1 | 12/2014 |
| JP | H03293222 A | 12/1991 |
| JP | H07157039 A | 6/1995 |
| JP | H7172538 A | 7/1995 |
| WO | 03029651 A2 | 4/2003 |
| WO | 2010085670 A1 | 7/2010 |

OTHER PUBLICATIONS

English Translation of International Search Report; International Application No. PCT/EP2016/055804; dated Aug. 18, 2016; 3 pages.

English Translation of Written Opinion of International Searching Authority; International Application No. PCT/EP2016/055804; dated Aug. 18, 2016; 8 pages.

Official Communication from the German Patent Office for related DE Application No. 102015104023.9 dated Nov. 18, 2015; 2 pages.

Official Communication from World Intellectual Property Organization PCT Application No. PCT/EP2016/055804 dated Jun. 8, 2016; 6 pages.

* cited by examiner

CONVEYOR DEVICE HAVING A LINEAR DRIVE AND HEIGHT-ADJUSTABLE CARRIERS FOR CONVEYING OBJECTS

CROSS-REFERENCES TO RELATED APPLICATIONS

This patent application is a 371 of International Application No. PCT/EP2016/055804, filed Mar. 17, 2016 which claims the priority of German Application No. 102015104023.9, filed Mar. 18, 2015, each of which are incorporated herein by reference in their entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY INVENTOR OR A JOINT INVENTOR

Not applicable.

FIELD OF THE INVENTION

The invention relates to an apparatus for moving objects having a plurality of individually movable transport movers for transporting the objects, having a path system for the transport movers in which the transport movers are movable along at least one predefined path in a transport direction, and having a control device for controlling the movements of the transport movers in the path system, wherein the transport movers each comprise at least one runner cooperating with the path system, at least one carrier for objects, and at least one holder for the carrier attached to the runner.

The invention can be used in the sector of food processing, but is not restricted to this sector. The objects can accordingly be food products, for example so-called portions that comprise one or more slices, e.g. stacked or overlapping slices, that were cut off from a food product, e.g. sausage or cheese.

DESCRIPTION OF RELATED ART

A transport system which can generally be used for the invention and to which reference will explicitly made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is provided by permanent magnets. When the runner of the linear motor carries the permanent magnets and the stator of the linear motor produces the electromagnetic traveling field, the drive principle of an LSM drive can be figuratively imagined such that the transport mover provided with the permanent magnet is pulled over the transport line by the magnetic field moving along the stator. Such a transport system or drive principle is described, for example, in WO 2003/029651 A2 and WO 2010/085670 A1. Reference is herewith explicitly made to these documents with reference to the disclosure of a possible drive principle or functional principle for the invention.

The path system or the individual paths of such a transport system can be divided into a plurality of consecutive path elements which so-to-say each form a single linear motor and can be individually controlled by a control device. If the transport movers located in the path system can be simultaneously identified by means of the control device, generally any desired number of transport movers can then be operated simultaneously in a path system of generally any desired complexity and can be individually moved in this respect.

The above-mentioned company MagneMotion, Inc. uses a technique for the identification and localization of the individual transporters in the path system in which each transporter mover is provided with a transducer which induces a signal in the stator formed by the path system, whereby it is made possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the paths into a plurality of path elements—which so-to-say each represent a single linear motor—that no collisions occur between the consecutive transporter movers. A transport mover can thus only travel into the next path element when it is permitted by the control device, which is in particular not the case when another transport mover is located in the path element.

SUMMARY OF THE INVENTION

Against the background of this generally known transport system, provision is made in a possible embodiment in the invention that the path system is configured as a stator of the linear motor.

The runner is in particular a respective component of a linear synchronous motor, with the runner in particular comprising at least one permanent magnet and the path system being configured as a motor stator.

The path system is in particular divided into a plurality of path elements which in particular each represent a single linear motor and which are individually controllable by the control device.

The transport movers are preferably identifiable by the control device.

The transport movers can furthermore preferably be localized in the path system by the control device.

The transport system has a plurality of transport movers whose total number depends on the respective application. Provision can be made that the path system comprises several dozen up to some hundred transport movers, i.e. a positive "cluster" of transport movers can be present in the path system to transport a plurality of objects and optionally to carry out additional functions such as a buffering, a distribution and/or an association of objects, in particular portions.

With such a transport system, the placing of objects onto the carrier and the picking of objects from the carrier in particular have special importance. This object handling must be able to be carried out in a simple manner that is as gentle and as reliable as possible. If external handling devices such as robots are used, reliable access of these handling devices to the carrier must be ensured. So-called "pick-and-place" robots or "pickers", that as a rule have grippers equipped with buckets, are frequently used for picking portions comprising one or more cut-off food slices. If such robots should be used in conjunction with the transport system disclosed here, it must be ensured that they can grip a portion lying on the carrier safely, gently and reliably.

It is desirable in specific applications to use such transport movers whose carriers are able to transport more than only one portion. In this respect, the portions are usually disposed relatively tightly next to one another since otherwise carriers would be necessary that project laterally relatively far beyond the path, that would consequently have to be comparatively large and that would result in relatively high centrifugal force influences during cornering. Apart from this, it is generally endeavored to keep the space requirements for a line or path as small as possible. In such cases, care must moreover be taken during the placing and picking of individual portions that the respective handling apparatus used does not interfere with the respective other portion or with a placing or removal procedure just being carried out at the respective other portion.

It is therefore the object of the invention to provide an apparatus of the initially named kind that enables a safe and reliable transport as well as a safe and reliable handling of the objects in the satisfaction of the above-mentioned demands.

This object is satisfied by a plurality of transport movers individually movable by means of magnetic conveying technology and/or linear motor technology for the transport of the objects; a path system for the plurality of transport movers in which the plurality of transport movers are movable along at least one predefined path in a transport direction; and a control device for controlling the movements of the plurality of transport movers in the path system, the plurality of transport movers each comprise at least one runner cooperating with the path system; at least one carrier for objects; and at least one holder attached to the runner for the carrier; and in particular in that the carrier is adjustable relative to the runner between a lower transport position and an upper functional position and is in so doing guided through the holder.

The lower transport position ensures a reliable and safe transport of the respective objects. The functional position that is raised in this respect in particular enables simple and unimpeded access to the carrier or to objects to be removed from the carrier for external handling devices. The guidance of the adjustable carrier by the holder ensures a defined relative position between the carrier and the runner at all times without additional guidance means or positioning means being required.

Further advantageous embodiments of the invention are also set forth in the dependent claims, in the description and in the drawing.

The holder can comprise a plate-shaped basic design having one or more receivers for a respective one carrier. The holder can in this respect have a frame-like structure in which the or each receiver is bounded in the manner of a frame by web-like sections of the holder.

In the transport position, a support section of the carrier can lie on the holder, with said support section projecting beyond a guide section cooperating with the holder during the adjustment.

In the raised functional position, the support section no longer lies on the holder, that is, is accessible from below, so that the support section can be used by a handling device within the framework of the respective provided handling process. This has the advantage that no regions of the carrier that may be critical in a hygienic regard have to be contacted by external handling devices. The carrier thus so-to-say represents an interface between its upper side that may be critical under hygienic aspects and the region beneath the upper carrier side less critical in this regard.

The support section can be formed by a carrier section of the carrier for objects that projects laterally outwardly. The carrier can hereby have a particularly simple design.

Provision can furthermore be made that the holder comprises at least one receiver for the carrier into which a guide section of the carrier can be inserted. In this manner, the carrier can be particularly simply fixed transversely to the adjustment device and guided in the adjustment direction.

In a further development, the carrier and the receiver can be matched to one another such that the carrier can be removed upwardly from the receiver of the holder beyond the upper functional position and can consequently be completely removed from the holder. This can be utilized for different purposes. Provision can thus be made, for example, not to directly place or take up the portions or objects transported by means of the carriers, but rather to carry this out indirectly via the carrier removable from the holder in a simple manner. A robot, for example, only has to grip beneath a support section of the carrier raised in the functional position for this purpose to remove the carrier together with an object lying thereon.

In accordance with a further development of the invention, the receiver can comprise an opening at at least one side for a lateral introduction and removal of the carrier. The receiver can in particular have a device that cooperates with the carrier, in particular with its guide section, with the device acting to inhibit movement and/or to damp vibrations.

The holder can consequently have at least one open side. The open side can face to the front or to the rear with respect to the transport direction. Alternatively, the holder can be open toward the side with respect to the transport direction.

It is hereby possible to remove and reintroduce the carrier not only upwardly, but also toward the side, i.e. to the front, to the rear, to the left or to the right with respect to the transport direction. The carriers consequently do not have to be lifted out. Such a removal, that can also be called "horizontal", can take place for cleaning purposes, for example. The carrier can, for example, be pushed in and pushed out or pulled out again laterally.

In conjunction with such a lateral opening or alternatively also independently thereof, i.e. in conjunction with a receiver not open at one side, the holder can be provided at the point where it cooperates with the carrier with an element, e.g. a flat or elongated element, for example of rubber or another material, that serves to avoid or at least to inhibit relative movements between the holder and the carrier. With a suitable material selection, a damping of oscillations or vibrations can hereby also be implemented. The edges or marginal regions bounding the receiver can, for example, be provided with pushed-on protectors that can likewise be formed as movement-inhibiting and/or vibration-damping.

An increased adhesion can be realized for the carrier by such measures, which moreover has the advantage that in the case of a laterally open mount such as was explained above, the carrier is prevented from unintentionally moving out of the receiver over the open side. Additional securing or locking measures for the carrier are then not required at the holder.

In accordance with a further embodiment, the carrier can be inserted into the holder in a plurality of different orientations and can be respectively non-rotatable relative to the holder in the inserted state. This makes it possible to use the carrier selectively in one of a plurality of spatial orientations relative to the holder and thus with respect to the path system overall. A rectangular carrier or a carrier having a rectangular carrying section for the objects can, for example, be inserted into the holder either in the transverse orientation or in the longitudinal orientation with respect to the path extent. A carrier not having a preferred direction, e.g. a square carrier, or a carrier having a square carrying section for the objects can be inserted into the holder in any desired orientation. The maintenance of the respective selected orientation is ensured by the non-rotatability in the inserted state.

Alternatively, the carrier can be rotatable relative to the holder in the inserted state. Different placement positions for the objects on the carrier can in particular be implemented by such a rotatability. The rotatability of the carrier can e.g. take place in a purely mechanical manner or using an electric motor.

In a comparatively simple mechanical embodiment, the carrier can be rotated while using the movement of the transport mover along the path in that an engagement apparatus provided at a rotation station, in particular an engagement apparatus that is stationary with respect to the path, engages into the route of the carrier along the path and the carrier is rotated about a predefined angular range on moving past this engagement apparatus. The carrier can be provided for this purpose with engagement elements that serve to cooperate with the mentioned engagement apparatus. Such elements can, for example, be projections distributed evenly in the peripheral direction about a carrier formed e.g. in a substantially circular cylindrical manner and projecting from the carrier in the radial direction.

In a preferred embodiment, the carrier is rotatable between discretely distributed angular positions. It can hereby be achieved that only specific angular positions of the carrier relative to the holder are possible. For example, the carrier and the holder can cooperate via support surfaces that are formed in the manner of saw teeth, that only engage into one another completely or at least substantially complementarily in a specific relative angular position and that are each formed at the end faces of circular cylindrical sections of the carrier and of the holder. When moving past a respective rotation station, the carrier can then be rotated by one or more teeth of the support surfaces into the next or into one of the next relative angular positions.

A torque relative to the holder can consequently be provided to the carrier by the mentioned engagement apparatus, while the holder together with the runner of the transport mover moves onward along the path. The rotational process is ended when the engagement apparatus releases the carrier again due to the further movement of the transport mover.

To realize the respective angular positions of the carrier and thus the placement positions for the objects (in the food sector, for example, different forms or placement patterns of portions formed from cut-off food slices), the transport movers can also move past the rotation station multiple times, and indeed alternately in a forward and rearward direction. The rotary support of the carrier on the holder can be formed in the manner of a ratchet in a further development of the invention in order in this manner to effect a rotation about a corresponding multiple of a respective smallest angle of rotation by multiple consecutive cooperation with the engagement apparatus (e.g. in each case in a forward direction, respectively interrupted by a "lunging movement" in the backward direction).

Provision can furthermore be made that the carrier is raisable into the functional position by cooperation with a cam contour of the path system and/or can be lowered into the transport position by the assistance of gravity. The movement of the transport mover in the path system can be utilized in this manner in order, for example, to raise a carrier running into the lower transport position by means of a ramp-like slotted part on passing through a predefined path section. Subsequently to a handling process, in particular a picking of transported objects, the carrier can then, on a further travel of the transport mover, again be lowered into the transport position with the assistance of gravity.

In accordance with a particularly preferred embodiment of the invention, the holder can be configured for receiving a plurality of carriers adjustable and guided independently of one another. Two carriers disposed next to one another in the transverse direction can in particular be arranged as adjustable independently of one another at a common holder. An independent raising or lowering can then take place, for example, by a cam contour extending at the left side for the left carrier and by a cam contour extending at the right side for the right carrier.

In accordance with an embodiment of the invention, the path system can have one or more corner sections at whose inner regions a respective cam contour is located through which the carrier of a transport mover is raisable to a level unimpeded by leading and/or trailing transport movers.

The circumstance can be countered here that with transport movers following one another comparatively tightly in corner regions of the path, the carriers of the transport movers moving inwardly around the corner can interfere with one another when the carrier at the inner corner of a leading transport mover pivots into the region of the carrier at the inner corner of the trailing transport mover due to the cornering. The carriers are at different height levels by a raising of the respective inner carrier traveling through the corner so that they can overlap one another and consequently do not interfere with one another.

In this manner, a tighter moving up of the transport movers is also made possible in corner regions. The transport capacity of the total system can hereby be increased without the path system having to be correspondingly increased in size.

Provision can furthermore be made in accordance with an embodiment that at least one transport mover has at least two runners cooperating with the path system and movable relative to one another, with the carrier being coupled to both runners via an adjustment device that is configured to convert a change of the spacing between the two runners into a change of the orientation of the carrier, in particular into a tilt change of the carrier with respect to the transport direction.

The carrier and thus a support surface for the objects can hereby be slanted such that a slipping or even a sliding off of an object on or from the carrier respectively is prevented on an acceleration or deceleration of the transport mover. This also means that the maximum speed of the transport movers is increased by such a tilt change of the carrier. This increases the throughput of the total system.

Alternatively to a change of orientation of the carrier due to a change of spacing of two runners, the orientation of the carrier can be adjusted from the outside by an external influence. This is also possible for such transport movers that only have one single runner. In the region in front of line sections that enable comparatively high speeds or that require relatively low speeds, a respective engagement apparatus of any type can be present that can cooperate with the carriers of transport movers moving past in the sense of a corresponding change of orientation, in particular a tilt setting.

In accordance with a further embodiment of the invention, at least one weighing station can be provided in the path system that has at least one weighing point for a carrier raised into the weighing position, with the carrier in particular being able to be raised relative to the runner into the weighing position by means of the weighing station and/or by means of a separate cam contour.

When raising the carrier, it can be released from the holder such that the carrier including an optionally taken up object can be weighed.

In an exemplary application, the tare weight of the carrier can be determined for each transport mover, e.g. after its cleaning, before the transport mover is again channeled into a respective desired path line or is, for example, supplied to a reception region in which one or more objects are to be taken up. The respective determined weight value can be associated with the respective transport mover. Alternatively, the association can take place with the respective carrier or with the respective holder, and indeed in particular when this carrier or this holder is provided with an information carrier of any type, for example with an RFID chip.

Provision can furthermore be made in accordance with the invention that at least one blowing station is provided in the path system that is configured to apply a blowing medium from below to the carrier and/or to the support surface of a carrier of a transport mover located at the blowing station, with the carrier and/or the support surface of the carrier being provided with one or more upwardly open apertures for the blowing medium.

Such a blowing through of air, for example, can in particular take place at positions at which received objects, for example portions of food slices, are picked up by means of a picking device such as a pick-and-place robot (also called a picker).

The respective object or the food slice portion can be more easily released by the application of the blowing medium, which facilitates the picking of the object or of the portion. This is in particular advantageous with objects such as in particular food products that tend to adhere or to "stick tight".

In this respect, food slice portions can in particular be placed onto so-called underleavers that comprise film, paper or similar. The use of a downwardly effective blowing medium is then even more advantageous. The traveling beneath of such an underleaver by means of a receiver, in particular of bucket form, of a gripper can be facilitated, for example, when the margin of the underleaver is blown at least slightly upwardly.

The blowing station is preferably a stationary device and is e.g. associated with a correspondingly designed path section.

In general, provision can respectively be made in connection with all the aspects disclosed here that the holder is releasably attached to the runner. It is hereby possible to provide the runners of the transport movers with different types of holder.

Figure 4:
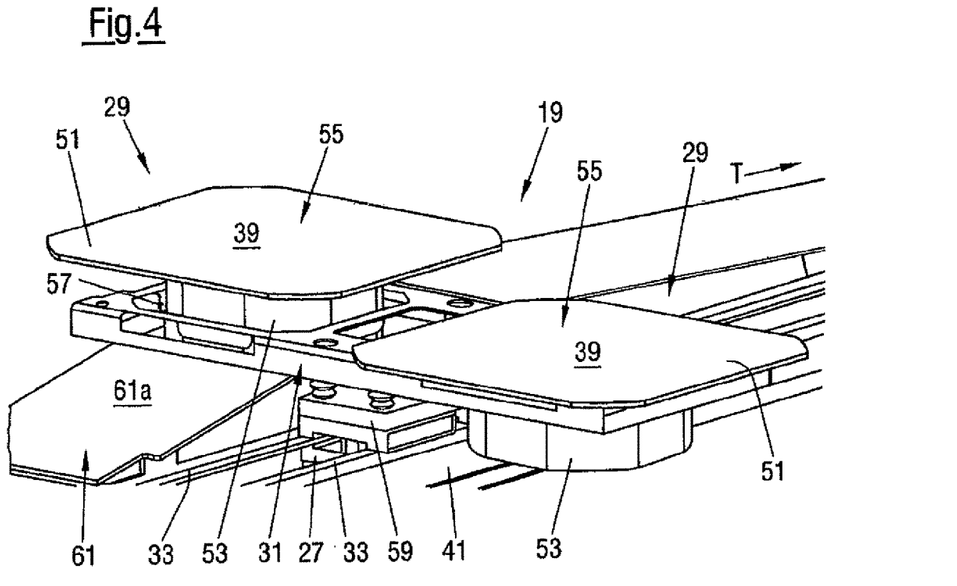
FIGS. 4 and 5 different perspective views of a part of an apparatus in accordance with the invention with a transport mover in accordance with the invention in accordance with an embodiment of the invention.
Figure 5:
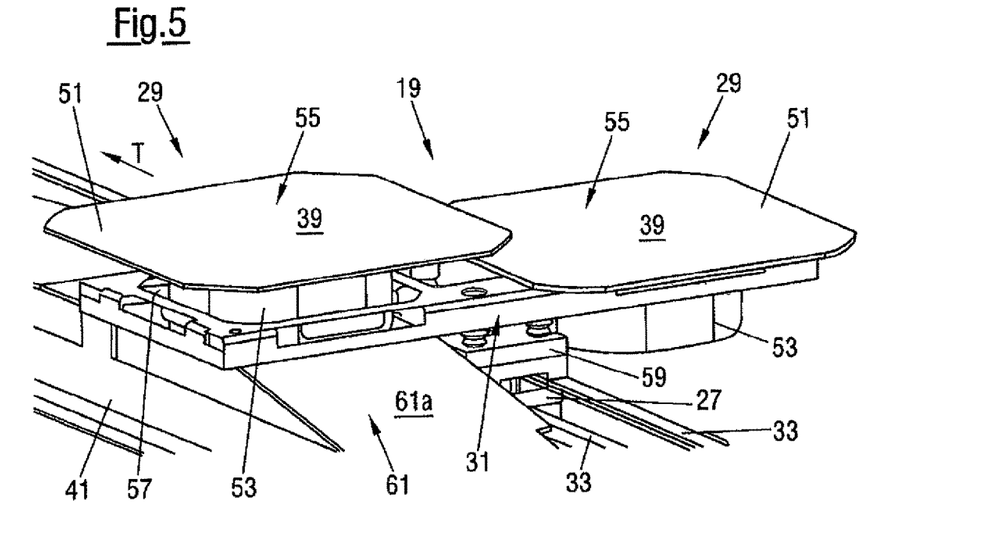

A holder type can, for example, be configured to receive two carriers such as is shown in FIGS. 4 and 5.

Alternatively, a holder type can be configured for receiving only one carrier, with the receiving region of the holder for the carrier in particular projecting laterally.

A further holder type that can in particular be of a frame type can be configured to transport so-called trays or generally bowls of pieces of packaging, and indeed such that these trays or bowls cooperate with the holder such that they cannot slip to the side.

A further alternative type of holder can itself be formed as a carrier for objects and can, for example, have a planar support surface. Such a holder can, for example, comprise a plate-like support.

Provision is made in accordance with a further embodiment of the invention that, in addition to the transport movers, at least one functional model or at least one functional mover is provided that comprises at least one runner cooperating with the warning system, at least one functional module and at least one holder for the functional module attached to the runner, with the functional module being compatible with the holders of the transport movers.

Consequently a runner with holder can serve either as a transport mover or as a functional mover. To serve as a functional mover, the carrier is replaced with a functional module that can be used together with the holder of the respective transport mover due to its compatibility. A receiver of the holder designed for a carrier can consequently be used as a receiver for a functional module as required.

The functional module can, for example, serve as a cleaning apparatus, as a lubrication apparatus (preferably including a lubricant store), a disinfection apparatus (preferably including a disinfectant store) or as a measurement and/or test device for the path system and/or for stations associated with the path system.

The working or active range of the functional module can be disposed above, beneath, in front of or behind the functional mover with respect to the transport direction. If the holder has a laterally projecting region for receiving a carrier, a region next to the path line can be served by means of the functional module on a use of a functional module instead of the carrier due to the projection.

The invention additionally relates to a transport mover for an apparatus in accordance with the invention, wherein the transport mover comprises at least one runner cooperating with the path system, at least one carrier for objects, and at least one holder for the carrier attached to the runner, and wherein the carrier is adjustable relative to the runner between a lower transport position and an upper functional position and is guided through the holder in so doing.

BRIEF DESCRIPTION OF THE SEVERAL VIEW OF THE DRAWINGS

The invention will be described in the following by way of example with reference to the drawing. There are shown.

The embodiments of the invention described in the following are based on a drive principle for transport movers (also simply called "movers" in the following) in a path system by linear synchronous motors (LSM drive) such as was explained by way of example in the introductory part with reference to the transport system of the company of MagneMotion, Inc. As many movers as desired in a path system which is as complex as desired can be moved individually, i.e. independently of one another, in the path system by means of a control device and can be localized and identified by means of the control device. The movers can furthermore be moved and positioned with extremely high precision in the path system. The movement speeds and accelerations and decelerations for the movers can likewise be selected and carried out as desired and individually.

DETAILED DESCRIPTION OF THE INVENTION

Figure 1:
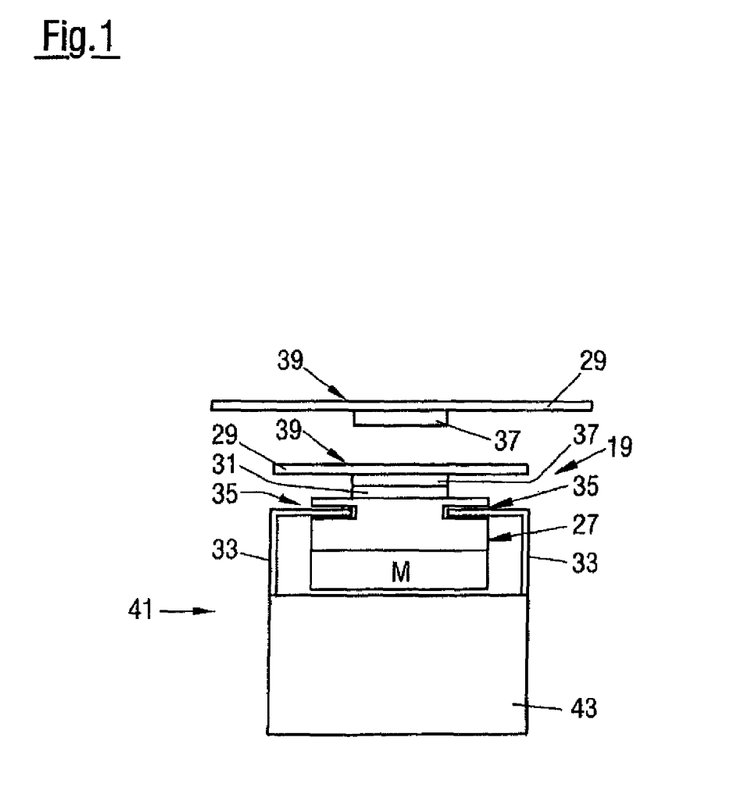
FIG. 1 a transport mover not belonging to the invention arranged in a path section for an explanation and for an understanding of the invention.

FIG. 1 shows a cross-section, that is a section perpendicular to the transport direction, through a path with a mover arranged therein. The mover shown here does not belong to the invention, but rather serves for the explanation and for the understanding of the movement principle underlying the invention.

A path section 41 of the path system comprises a base serving as a stator 43 of the LSM drive which also serves as a mechanical base for attaching the path section 41, for example, to a substructure or to racks or holders of any desired form.

A path section of the so-called U type is shown in FIG. 1, i.e. the path section is upwardly open and the movers 19 are located above the stator 43.

Guide rails 33 which are designed as angled metal sheets and which run in slits 35 which are formed at the left and right side surfaces of a runner 27 of the mover 19 serve as a guide for the mover 19 here. The guides of the path system for the movers 19 can, however, also be differently configured.

The guidance of the path system provides a defined relative position of the runner 27 with respect to the stator 43. It is in particular hereby achieved that a permanent magnet arrangement M of the runner 27 observes an exactly defined spacing from the stator 43.

In accordance with the LSM drive, the runner 27 provided with the permanent magnet arrangement M is movable by a corresponding control of the stator 43 by means of a control device not shown here in the transport direction along the stator 43 and thus in the path comprising the stator 43. The runner 27 is guided by the guide rails 33 during this movement.

A carrier 29 is arranged on the runner 27 and provides a support surface 39, which is planar, for example, to transport food portions or other objects.

The carrier 29 can be fixedly connected to the runner 27. In an alternative embodiment, the carrier 29 is releasably attached to the runner 27.

A holder 31 of generally any desired design is provided between the carrier 29 and the runner 27. On a releasable attachment of the carrier 29 to the runner 27, the holder 31 can be configured as a component of a coupling or can form a coupling section which cooperates with a corresponding coupling section 37 of the carrier 29. The cooperation between the runner 27 and the holder 31 or between the holder 31 and the carrier 29 can generally take place in any desired manner. A purely mechanical connection can be provided. It is also possible that the carrier 29 is magnetically held at the holder 31 or the holder 31 is magnetically held at the runner 27. The holder 31 can also be configured to allow relative movements of the carrier 29 relative to the runner 27, for example a rotation about a vertical axis to be able to rotate or align portions in this manner.

The carrier 29 can also be directly connected to the runner 27. The holder 31 between the carrier 29 and the runner 27 is then formed by the cooperating regions or coupling sections of the carrier 29 and the runner 27.

As indicated in FIG. 1, a releasable attachment of the carrier 29 to the holder 31 enables a use of the runner 27 with different carriers of different sizes, for example. FIG. 1 thus shows purely by way of example a carrier 29 which is provided with a coupling section 37 and whose support surface 39 is larger than that of the carrier 29 attached to the runner 27 in FIG. 1.

Figure 2:
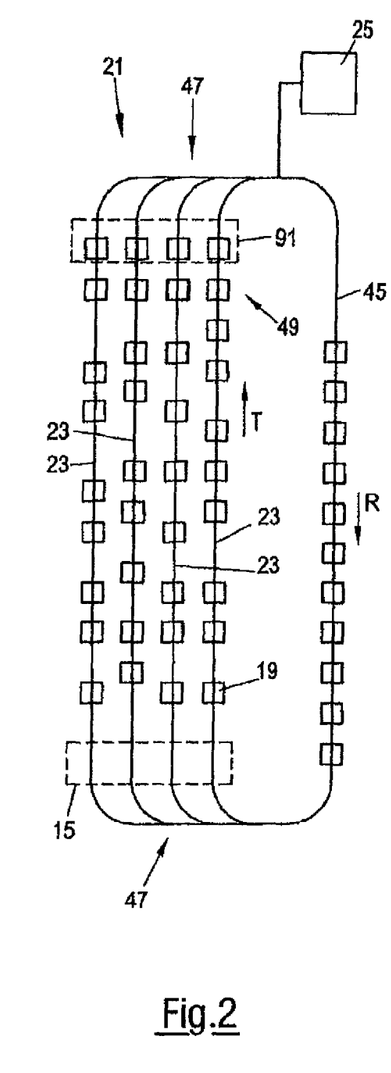
FIGS. 2 and 3 respectively, a schematic plan view of a possible embodiment of a total system in accordance with the invention.
Figure 3:
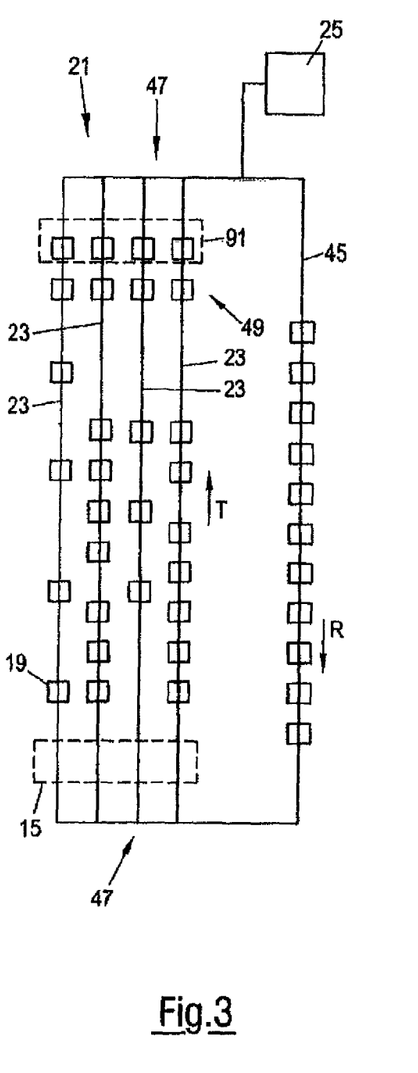

A total system in accordance with the invention, that is a system in accordance with the invention in which the movement apparatus in accordance with the invention or the transport system in accordance with the invention, including the path system, only represents a component—albeit a major component—is shown in different possible embodiments in FIGS. 2 and 3, with the representation respectively taking place in a schematic and simplified manner to illustrate the possibilities in accordance with the invention.

The systems respectively comprise a slicer 15 which is configured for a multi-track operation and with which a plurality of food products such as loaves of sausage or cheese can be cut into slices simultaneously at high speed by means of a circular blade or scythe-like blade revolving in planetary motion and/or in a rotating manner. The cutting speed is between several one hundred slices and some thousand slices per minute depending on the specific embodiment of the slicer 15.

A respective transfer device for portions of any type, for example at least one so-called insertion belt, can optionally also be located at the respective location instead of a slicer 15.

Portions which comprise a plurality of cut-off slices are as a rule formed from the cut-off slices.

The systems shown each comprise a packaging machine 91 which is not explained in any more detail here and at which the portions formed from the cut-off slices are packaged. It is frequently required for this purpose to combine the formed portions on their route from the slicer 15 to the packaging machine 91 in predefined formats 49 or format sets, i.e. in matrix-like arrangements in which one or more portions are arranged after one another in a respective plurality of tracks disposed next to one another. Within a respective format 49, the portions as a rule have to have a specific relative alignment relative to one another and have to be arranged with predefined spacings from one another and both in the transverse direction and in the direction of transport T so that the portions can be discharged format set-wise to the respective downstream packaging machine 91.

Such a format set-wise packaging is, however, not absolutely necessary. It is, for example, also possible to pick portions from the transport system and to place them in packs with the aid of robots.

It is nevertheless in practice an object of a transport system for food portions arranged between a slicer 15 and a packaging machine 91 to influence these portions in a variety of ways. In this respect, it is not only a question of a possibly required format set formation, but, for example, also the weighing of portions and the separation of portions not suitable for packaging.

A respective plurality of movers 19, each only indicated schematically as squares here, move in the path system 21 and at least some and in particular most of them are configured as transport movers for transporting food portions such as are-explained above in connection with FIG. 1.

The operation of the total system is respectively monitored and controlled by a control device 25 which in particular controls the individual movements of the movers 19 in the individual paths 23 of the path system 21.

Instead of a packaging machine 91, only a part of such a machine or one or more packs or parts thereof can also be provided into which the portions transported in by means of the movers 19 are placed down.

In the embodiment of FIGS. 2 and 3, the transport system in accordance with the invention is configured for four-track operation. Four paths 23 which extend in parallel and which each comprise a plurality of path sections 41 such as have been explained in connection with FIG. 1 extend between the slicer 15 and the packaging machine 91.

The transport system in accordance with the invention inter alia provides that upstream of the packaging machine 91 the movers 19 carrying the portions to be packaged are present in a format 49 which comprises a row of four portions arranged next to one another—in accordance with the number of tracks of this total system.

Subsequent to the packaging machine, the four paths 23 are led together to form a single path which forms a return line 45 in which the now empty transport movers 19 are guided back to the slicer in a return direction R directed opposite to the direction of transport T. The return line 45 branches into a four-track region again in the region of the slicer 15.

These transitions in the path system 21 are taken over by special functional regions which are also called branches 47 here.

In the embodiment of FIG. 2, the branches 47 comprise curved path sections, that is corner sections in which the movers 19 are each moved along a curved path.

The transport mover 19 respectively shown in an only partly shown path section 41 of a path system in accordance with the invention in FIGS. 4 and 5 comprises a frame-like holder 31 having a rectangular base surface that is oriented transversely to the transport direction T.

The holder 31 is supported via a base section 59 at the runner 27 that cooperates with the path system such as was explained above in connection with FIGS. 1 to 3.

Two cut-outs 57 are provided in the holder 31 that are arranged next to one another transversely to the transport direction T, that are provided as receivers, and that serve for the insertion of carriers 29 described in more detail below. The reception openings 57 have a cross-section that differs from a circular shape and is formed here as a square having rounded or chamfered corner regions.

The identically configured carriers 29 each comprise a carrier plate serving as a carrier section 55 and having a planar support surface 39 for objects to be transported which are portions in accordance with a preferred application of the invention that each comprise at least one slice cut off from a food product by means of a high-speed slicer.

The carrier plate 55 is provided at its lower side with a centrally arranged guide section 53 projecting perpendicularly downwardly. The guide section 53 has a constant outer cross-section shape substantially over its total longitudinal extent that, corresponding to the receivers 57 of the holder 31, has a square base shape with rounded or chamfered corner regions.

The guide sections 53 of the carriers 29 are each coordinated with the shape of the receivers 57. A contact between the guide section 53 and the border of the receiver 57 at all four sides is possible during the insertion, but with such an exactly fitting receiver of the guide sections 53 not being compulsory. It can be sufficient for the carriers 29 to be seated with a little clearance in the receivers 57 of the holder 31.

Due to the at least substantially constant outer cross-section shape of the guide sections 53, the carriers 29 can be adjusted, moved relative to the holder 31 in the vertical direction, i.e. between a lower transport position that is shown in FIGS. 4 and 5 for the right carrier 29 in each case and an upper functional position that the carrier 29 adopts that is respectively shown at the left in FIGS. 4 and 5.

In the lower transport position, the guide section 53 is exposed at the bottom so that the lower side of the carrier plate 55 lies on the upper side of the holder 31. The regions of the carrier plate 55 projecting laterally over the guide section 53 thus form a support section 51 of the carrier 29 overall.

Due to the cross-sections of the guide sections 53 differing from a circular shape and the correspondingly formed receiver openings 57, the carriers 29 cannot be rotated in the state inserted into the holder 31. The alignment or orientation of objects transported by means of the carriers 29 with respect to the transport direction T is thus maintained and cannot change unintentionally. The square basic shape of the guide sections 53 and of the carrier plates 55 and the central arrangement of the guide sections 53 at the carrier plates 55 enables the carriers 29 to be inserted into the receivers 57 of the holder 31 in any desired one of the four possible orientations without the orientation of the support surfaces 39 for the objects provided by the carrier plates 55 changing with respect to the path system or the transport direction T. It is consequently not necessary to observe a correct orientation on the insertion of the carriers 29.

Figure 6:
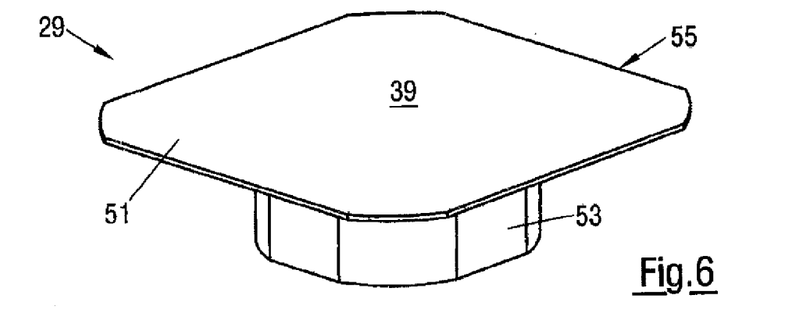
FIGS. 6 to 8 different views of a carrier of a transport mover in accordance with the invention in accordance with an embodiment of the invention.
Figure 7:
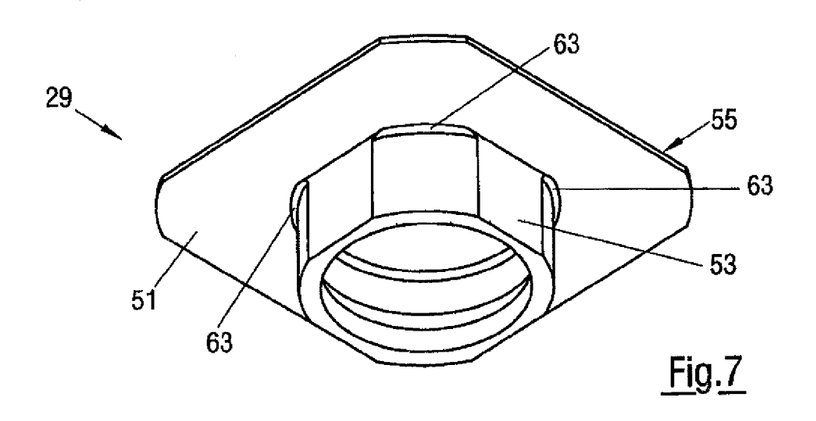
Figure 8:
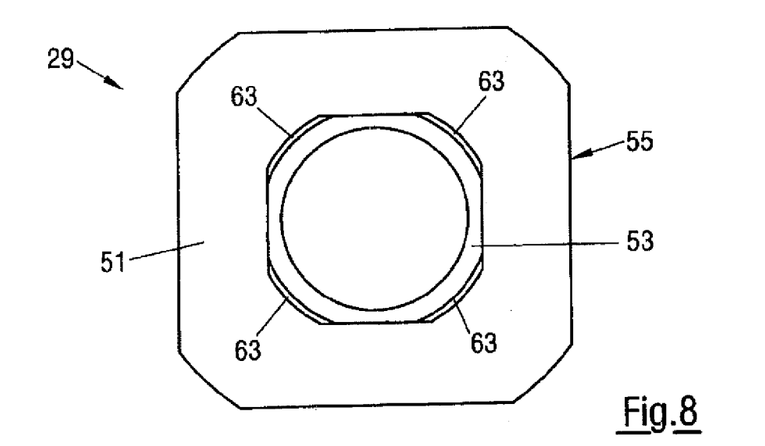

It can inter alia be seen from FIGS. 6 to 8 that each only show the carrier 29 in a non-inserted stand that the guide section 53 is hollow cylindrical with a circular inner contour in this embodiment.

Chamfers 63 in the region of the transition of the rounded corner regions into the lower side of the carrier plate 55 make it possible that the carrier 29 can be tilted to a certain degree relative to the holder 31 in the inserted state, but in so doing is still securely seated in the holder 31 and is thereby held at the transport mover. A tilt capability of the carrier 29 can be utilized for cornering, which will briefly be looked at in more detail in the following. A canting of the inserted guide sections 53 can furthermore be avoided by chamfers or splays at the guide sections 53 and/or at the borders of the receiver openings 57.

As shown in FIGS. 4 and 5 for the respective carrier 29 disposed at the left, the raising and lowering of the carrier 29 relative to the holder 31 takes place at a predefined region of the path system that has ramp-like cam contours for the guide sections 53 of the carriers 29 at the corresponding side of the respective path section 41. With an incoming transport mover 19, a ramp section 61 at the inlet side thus provides a raising of the carrier 29 that automatically moves back into the lower transport position again due to gravity on the running out of the transport mover 19 then no longer carrying any portion.

As shown in FIGS. 4 and 5, such a cam contour 61 for raising the carrier 29 in the transport direction T is only located at the left side, viewed in the transport direction T, in the region of the path shown, while no such cam contour is provided in the shown region for the carrier 29 at the right viewed in the transport direction T. A handling device, for example a robot, can consequently pick objects from the left carrier 29 without being impeded in so doing by the right carrier 29.

The control cam 61 not only effects the raising of the carrier 29, but also simultaneously provides a support of the carrier 29 over its guide section 53 such that forces applied to the carrier plate 55 by a handling device are introduced into the cam curve 61 and the actual path system and the holder 31 remain unloaded hereby.

Figure 9:
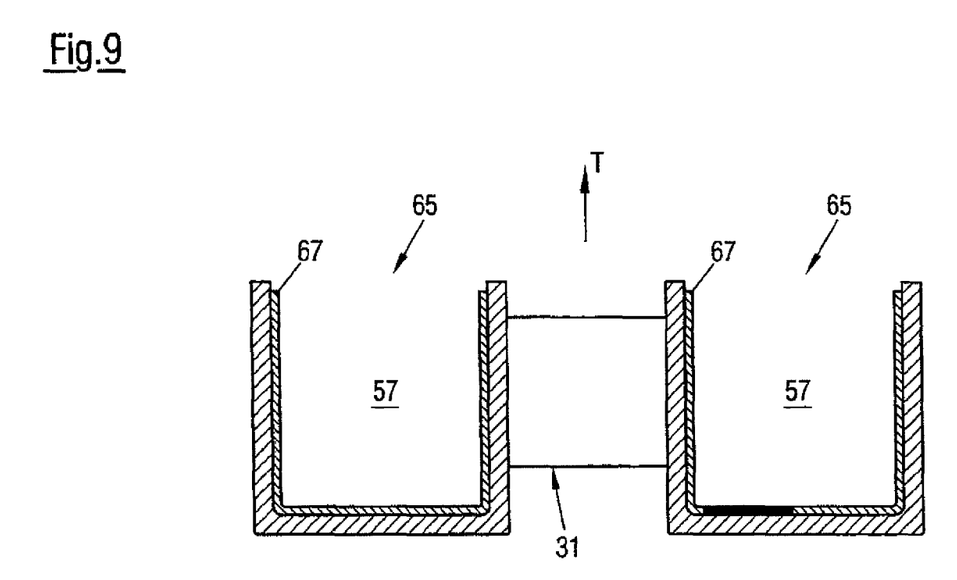
FIGS. 9 to 12 respective further developments of the invention.

FIG. 9 shows a schematic plan view of a transport mover in accordance with an embodiment of the invention of which only the holder 31 is shown. The holder 31 comprises two receivers 57, for carriers not shown here, arranged next to one another transversely to the transport direction T.

The receivers 57 are each open to the front with respect to the transport direction T. The respective guide sections 53 (cf. for example FIGS. 6-7) of the carriers can be pushed into the holder 31 and can be removed from it again via these lateral openings 65.

Separate locking or securing means that prevent the carriers from accidentally slipping out of their respective receivers, for example on a braking of the transport mover, are not necessary in this embodiment since the holder 31 is provided at its inner sides bounding the receivers 57 with a respective device 67 that exerts an increased frictional or clamping force on an inserted carrier and thus holds the carrier in the receiver 57. This device 67, that can be configured as a rubber lip or as an elastomer string for example, thus inhibits a movement of the carrier relative to the holder 31.

At the same time, the device 67 serves to prevent or at least to reduce the transmission of oscillations or vibrations between the carrier and the holder 31.

Figure 10:
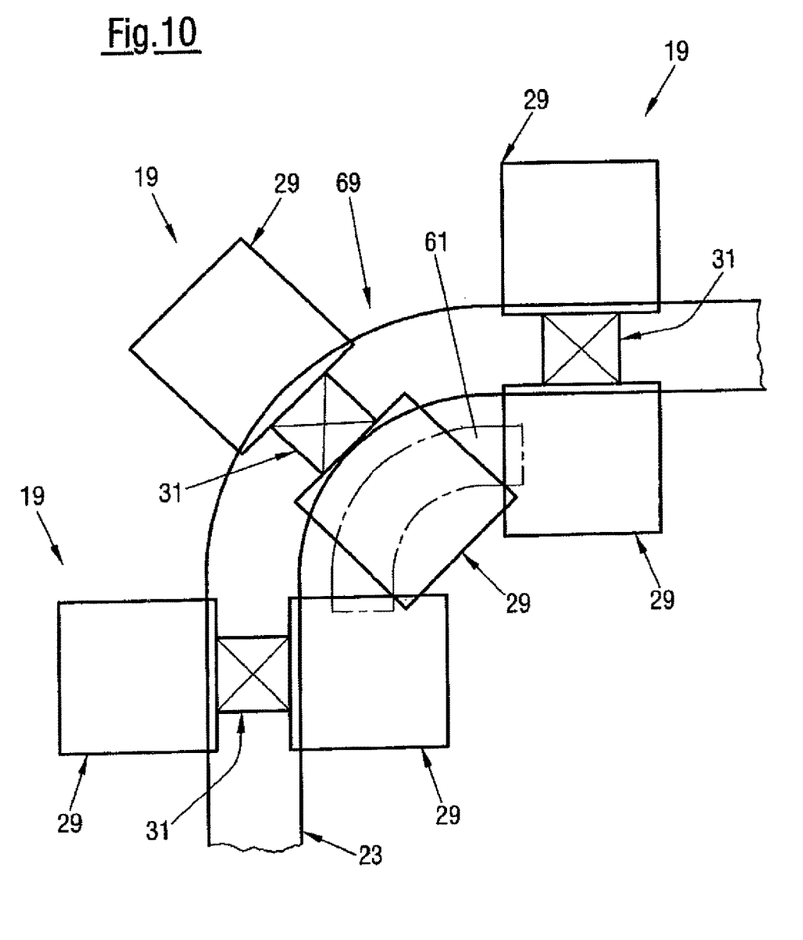

FIG. 10 schematically illustrates an application of a cam contour 61 that is in principle active in the same manner as the one which was described above in conjunction with FIGS. 4 and 5. The cam contour 61 here also serves to raise a carrier 29, in particular to partly raise it from a receiver of the holder 31. The circumstance that at least the part of the carrier 29 or of the support section 51 laterally projecting beyond a guide section 53 (cf. in particular FIGS. 4 and 5) moves to a higher level can be utilized for cornering maneuvers of the transport movers 19, as is indicated in FIG. 10.

The overlaps of the carriers 29 on the inner side of a corner section 69 of the path 23 that are indicated in FIG. 10 show that spacings of transport movers 19 traveling through the corner section consecutively that are too short bring about the risk that the carriers 29 following one another on the inner corner side interfere with one another. The carrier 29 can be raised to a level not interfered with by the other transport movers by raising the inner curve carrier 29 of the respective transport mover 19 just traveling through the corner section 69.

When the support section 51, as shown, for example, in FIGS. 4 and 5, is comparatively thin, the cam contour 61 only has to effect a comparatively short lift to prevent a mutual influencing of the carriers 29 in the region of the corner section 69. The lift can if necessary nevertheless be selected to be so large by a corresponding adaptation of the cam contour 61 that the respective carrier 29 moves to a level that is still above an object that lies on the carrier 29 of a leading or trailing transport mover 19.

Figure 11A:
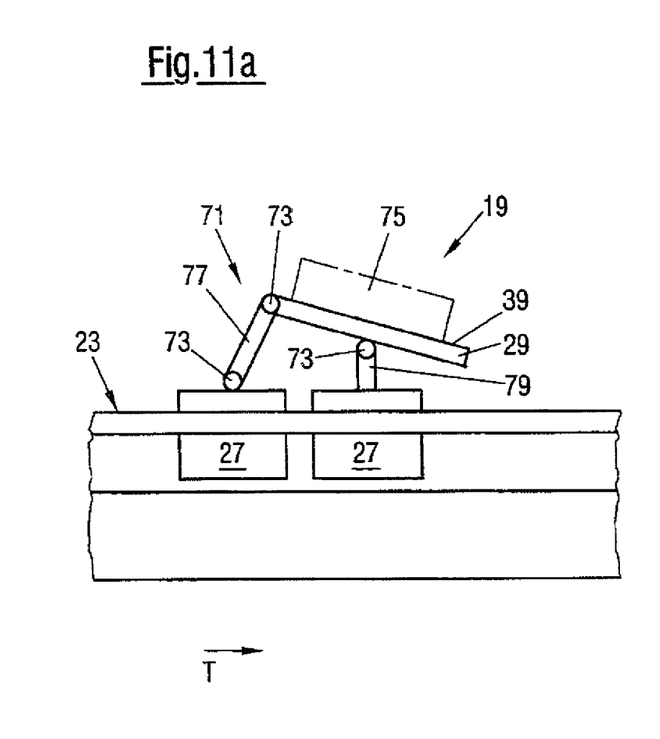
Figure 11B:
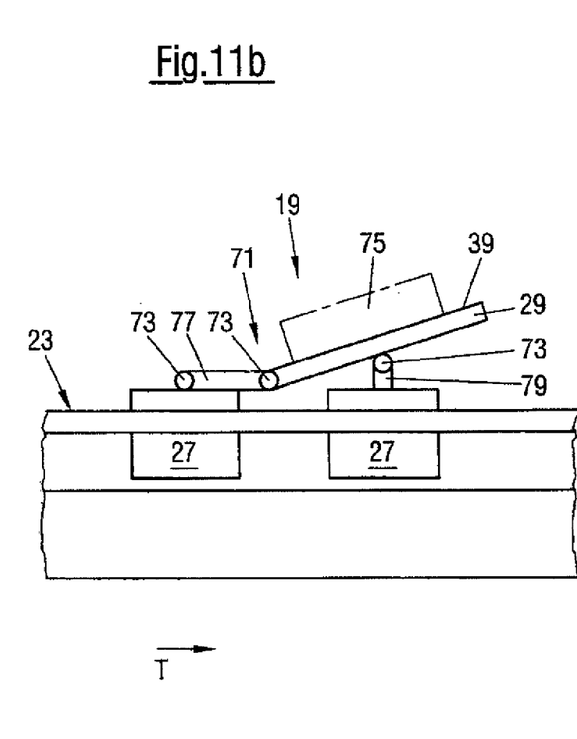

The embodiment indicated schematically in FIGS. 11a and 11b illustrates a possibility of implementing comparatively high accelerations or decelerations without there being a risk of a sliding of a transport object 75 from the carrier 29.

In this embodiment, the transport mover 19 is provided with two runners 27 that can be moved independently of one another in the path 23 such that the spacing between the two runners 27 can be changed in the transport direction T. The common carrier 29 is coupled to the two runners 27 via an adjustment device 71 that comprises a coupling member 77 in the embodiment shown here that is connected in an articulated manner between the carrier 29 and the runner 27 at the rear in the transport direction. The carrier 29 is furthermore connected in an articulated manner to a holding member 79 of the runner 27 at the front in the transport direction T. This connection of the carrier 29 to the two runners 27 movable independently of one another that is articulated due to the three axes 73 provides that the tilt of the support surface 39 of the carrier 29 can be adjusted in dependence on the spacing between the two runners 27.

In FIG. 11a, the support surface 39 is downwardly inclined with respect to the transport direction T, and indeed due to the comparatively small spacing between the two runners 27. The transport mover 19 can hereby be accelerated by a comparatively high amount.

The situation is correspondingly reversed in FIG. 11b. The relatively large spacing between the two runners 27 provides that the support surface 39 is rearwardly inclined with respect to the transport direction T. This enables relatively high decelerations of the transport mover 91.

Figure 12:
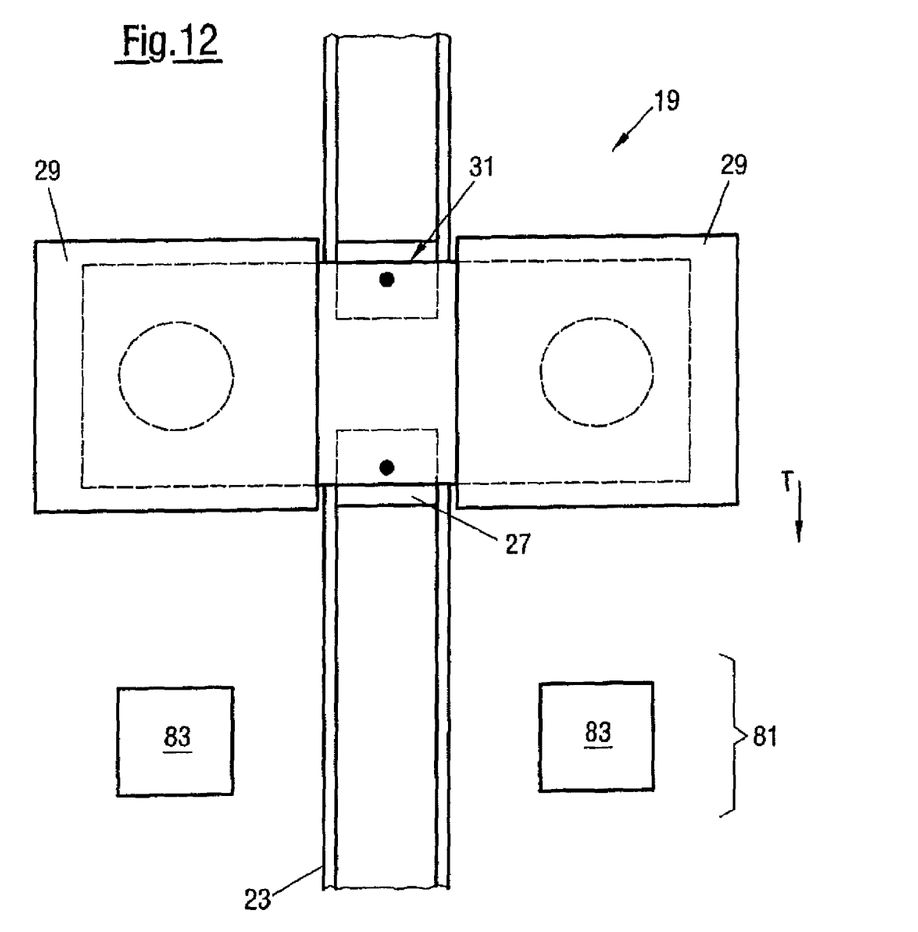

FIG. 12 schematically shows the integration of a weighing station 81 into the path system. A load cell respectively forming a weighing point 83 is arranged as stationary with respect to a path section at both sides of the path 23. The carriers 29 can each be released from the holder 31 and can consequently cooperate free of influence with the respective load cell 83 by raising the carriers 29 of a transport mover 19 stopping at the weighing station 81.

The raising of the carriers 29 can take place, for example, by a cam contour such as was in particular explained above in connection with FIGS. 4 and 5 and in connection with FIG. 10. Such a cam contour can be positioned before the respective load cell 83 in the transport direction T and can be adapted to the height level of the load cell 83. Alternatively, the load cells 83 can themselves each be configured such that they can raise the respective carrier 29 for the purpose of a weight determination with a transport mover 19 traveling into the weighing station 81.

Further possible embodiments of the invention that can optionally, but not necessarily, be combined with the above-explained embodiments and also with one another will be explained in the following.

As mentioned above, the two carriers 29 can be raised alternately so that a robot can respectively better grip a portion. It is, for example, also possible that a carrier 29 is raised so far by means of a cam contour that the support surface 39 can cooperate with a cleaning device in order thus to be able to be mechanically cleaned either when traveling past or when stationary at a corresponding cleaning position within the path system.

Objects or portions can also be transferred or picked by means of such a scraping principle.

It is furthermore possible to propel a carrier fully upwardly by means of a cam curve, i.e. to expel it from the holder 31. Carriers propelled or expelled in this manner can be supplied to a cleaning process, for example. It is also possible that the carriers are picked by means of a robot and are transferred to a cleaning/conveying or storage apparatus. Carriers that are optionally treated or cleaned can then in turn automatically be inserted by means of a robot or also manually into the holders 31 of the transport movers 19 at another point of the path system.

The guide sections 53 of the carriers 29 can each be fastened to the carrier plates 55 as separately manufactured components by suitable means. It is, however, also possible to produce the carriers 29 from one piece, which brings about advantages with respect to hygiene and cleaning ability.

As already explained above, the guide sections 53 of the carriers 29 can each be coordinated with the receivers 57 in the holders 31 with respect to shape and/or size such that clearance is present to be able to tilt the inserted carriers 29 in the holder 31. Such a tiltable storage of the carriers 29 can be utilized to act on a guide section 53 from below not centrally, but rather off center or at one side, for example by means of a cam contour. It is hereby possible to slant the carrier 29 when passing through corners in the path system to compensate centrifugal force influences on a respective transported object in this manner. For this purpose, for example, the path system can be provided with a run-on chamfer that is arranged toward the respective outer corner side, whereby the carrier 29 is only raised at one side and is slanted relative to the holder 31 due to the clearance.

The free ends of the guide sections 53 can, for example, be spherical or chamfered to promote a run-on at a cam contour in this manner.

The support surfaces 39 of the carrier sections 55 can be smooth, grooved, wavy or provided with projections, for example nub-like projections, or with other structures. The support surfaces can furthermore have a coating.

The carriers can be manufactured from a plastic that is in particular provided with a blue coloring to be able to detect lying objects particularly well with the aid of camera systems.

Provision can furthermore be made that the carrier is manufactured from a plastic having metal inclusions. In this manner, parts that may have been separated from the carrier can be recognized simply with the aid of metal detectors that are anyway in particular provided in practice for so-called prepackaging.

The carriers can be provided with bores or apertures at suitable points to promote a running off, for example of cleaning fluids, in all relative orientations of the carrier in space in this manner.

The carriers can furthermore be provided with structures such as bores or apertures that serve to be brought into engagement with other devices, for example with a drag conveyor, e.g. in the form of a chain conveyor. Bores introduced into the carriers at suitable points can furthermore serve as a sorting and/or alignment aid. An ordering of the carriers can thereby, for example, be simplified subsequent to a cleaning process before the carriers are again supplied to the path system.

Provision can furthermore be made that the carriers are regionally provided with stabilization features or reinforcement features, for example with a thicker marginal region and/or with reinforcement ribs that can, for example, have a radial arrangement.

REFERENCE NUMERAL LIST 15 slicing apparatus, slicer
19 transport mover
21 path system
23 path
25 control device
27 runner
29 carrier
31 holder
33 guide rail
35 slit
37 coupling section
39 support surface
41 path section
43 stator
45 return line
47 branch
49 format
51 support section
53 guide section
55 carrier section
57 receiver
59 base section
61 cam contour
61a section of the cam contour at the inlet side
63 chamfer
65 lateral opening
67 inhibiting and/or damping device
69 corner section
71 adjustment device
73 axis
75 object
77 coupling member
79 holding member
81 weighing station
83 weighing point
91 packaging machine
T transport direction
R return direction
M permanent magnet arrangement

The invention claimed is:

1. An apparatus for moving objects, the apparatus comprising a plurality of transport movers individually movable by means of magnetic conveying technology and/or linear motor technology for the transport of the objects;
   a path system for the plurality of transport movers in which the plurality of transport movers are movable along at least one predefined path in a transport direction; and
   a control device for controlling movements of the plurality of transport movers in the path system,
      wherein the plurality of transport movers each comprise at least one runner cooperating with the path system; at least one carrier for objects; and at least one holder attached to the runner for the carrier;

wherein the carrier is adjustable relative to the runner between a lower transport position and an upper functional position and in so doing is guided through the holder; and wherein the carrier is arranged to be inserted into the holder in a plurality of different orientations and is respectively non-rotatable relative to the holder in an inserted state.

2. The apparatus in accordance with claim 1, wherein a support section of the carrier that projects laterally beyond a guide section of the carrier cooperating with the holder during adjustment of the carrier.

3. The apparatus in accordance with claim 2, wherein the support section is formed by a laterally projecting carrier section of the carrier for objects.

4. The apparatus in accordance with claim 1, wherein the holder at least comprises a receiver for the carrier into which a guide section of the carrier can be inserted.

5. The apparatus in accordance with claim 4, wherein the receiver comprises an opening for a lateral introduction and removal of the carrier at at least one side.

6. The apparatus in accordance with claim 5, wherein the receiver has a device that cooperates with the carrier and that acts as movement-inhibiting and/or vibration-damping.

7. The apparatus in accordance with claim 6, wherein the device that cooperates with the carrier cooperates with the guide section of the carrier.

8. The apparatus in accordance with claim 1, wherein the carrier is rotatable relative to the holder in the inserted state.

9. The apparatus in accordance with claim 8, wherein the carrier is rotatable relative to the holder between discretely distributed angular positions.

10. The apparatus in accordance with claim 1, wherein the carrier is raisable into the functional position by cooperation with a cam contour of the path system and/or is lowerable into the transport position by the assistance of gravity.

11. The apparatus in accordance with claim 10, wherein the path system has one or more corner sections at whose inner regions a respective cam contour is located through which the carrier of a transport mover is raisable to a level not interfered with by leading and/or trailing transport movers of the plurality of transport movers.

12. The apparatus in accordance with claim 1, wherein at least one transport mover has at least two runners cooperating with the path system and the at least two runners being movable relative to one another, with the carrier being coupled to both runners via an adjustment device that is configured to convert a change of the spacing between the two runners into a change of the orientation of the carrier.

13. The apparatus in accordance with claim 12, wherein the adjustment device is configured to convert a change of the spacing between the two runners into a tilt change of the carrier with respect to the transport direction.

14. The apparatus in accordance with claim 1, wherein at least one weighing station is provided in the path system and has at least one weighing point for a carrier raised into a weighing position.

15. The apparatus in accordance with claim 14, wherein the carrier is raisable into the weighing position relative to the runner by means of the weighing station and/or by means of a separate cam contour.

16. The apparatus in accordance with claim 1, wherein at least one blowing station is provided in the path system that is configured to apply a blowing medium from below to the carrier and/or to the support surface of a carrier of a transport mover located at the at least one blowing station, with at least one of the carrier and the support surface of the carrier being provided with one or more upwardly open apertures for the blowing medium.

17. The apparatus in accordance with claim 1, wherein, in addition to the plurality of transport movers, at least one functional module or at least one functional mover is provided that comprises at least one runner cooperating with the path system; at least one functional module; and at least one holder for the functional module attached to the runner, with the functional module being configured as compatible with the holders of the transport movers.

18. The apparatus in accordance with claim 1, wherein the holder is configured for receiving a plurality of carriers adjustable and guided independently of one another.

19. A transport mover for an apparatus, the apparatus comprising a plurality of transport movers individually movable by means of magnetic conveying technology and/or linear motor technology for the transport of the objects;

a path system for the plurality of transport movers in which the plurality of transport movers are movable along at least one predefined path in a transport direction; and a control device for controlling the movements of the plurality of transport movers in the path system, the transport mover comprising:

at least one runner cooperating with the path system; at least one carrier for objects; and at least one holder for the carrier attached to the runner, wherein the carrier is adjustable relative to the runner between a lower transport position and an upper functional position and in so doing is guided through the holder.

* * * * *